A. L. PAULSON.
LOCK.
APPLICATION FILED OCT. 6, 1919.

1,386,358.

Patented Aug. 2, 1921.
2 SHEETS—SHEET 1.

Inventor
Amel L. Paulson

A. L. PAULSON.
LOCK.
APPLICATION FILED OCT. 6, 1919.
1,386,358.
Patented Aug. 2, 1921.
2 SHEETS—SHEET 2.
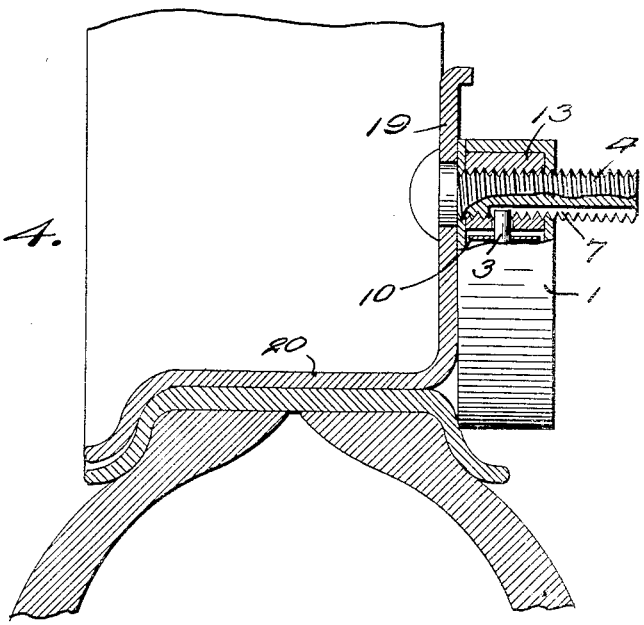
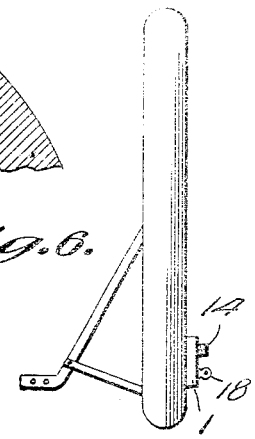
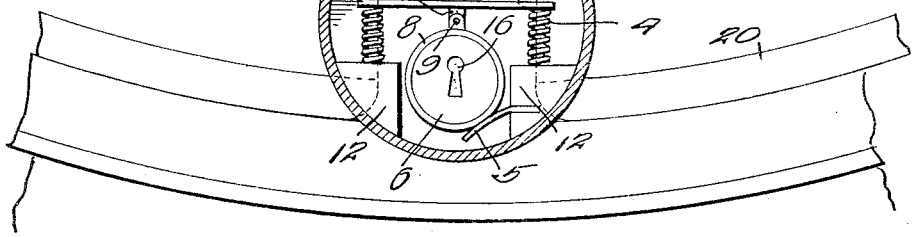
Inventor
Amel L. Paulson

UNITED STATES PATENT OFFICE.

AMEL L. PAULSON, OF McCOOK, NEBRASKA.

LOCK.

1,386,358.  Specification of Letters Patent.  Patented Aug. 2, 1921.

Application filed October 6, 1919. Serial No. 328,855.

*To all whom it may concern:*

Be it known that I, AMEL L. PAULSON, a citizen of the United States, residing at McCook, in the county of Redwillow and State of Nebraska, have invented a new and useful Lock, of which the following is a specification.

The object of my invention is to provide a lock which will be noiseless when used in connection with any machinery in motion having a vibration. It is especially my object to provide a lock for automobiles which will not rattle and which may be readily applied to the standard of the car. I attain the objects of my invention by the mechanism illustrated in the accompanying drawings, in which—

Fig. 4 is a vertical section, partly in elevation of the lock applied to a spare tire carrier;

Fig. 5 is front elevation of the lock, the lock casing being shown in section; and Fig. 6 is a side elevation of the lock and spare tire holding device, with a tire mounted thereon.

Like numerals designate like parts in each of the views.

Figure 1:
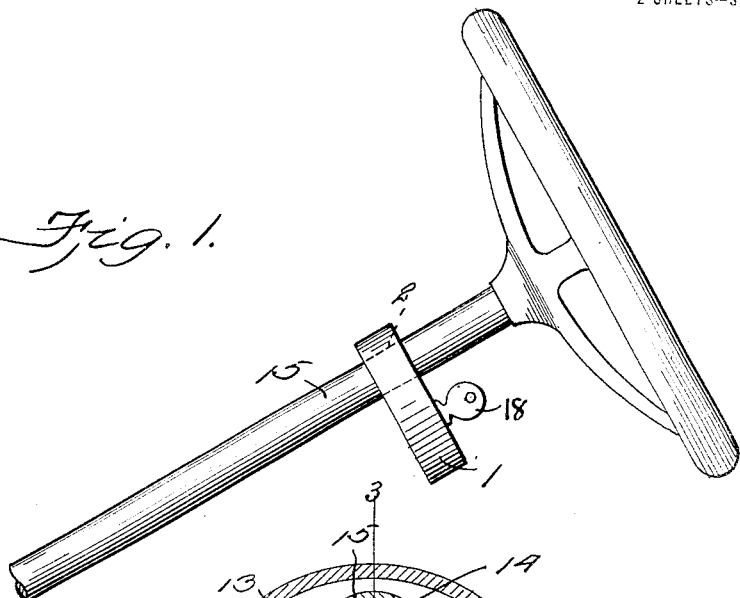
Figure 1 is a side elevation of the invention applied to the steering post of an automobile.
Figure 2:
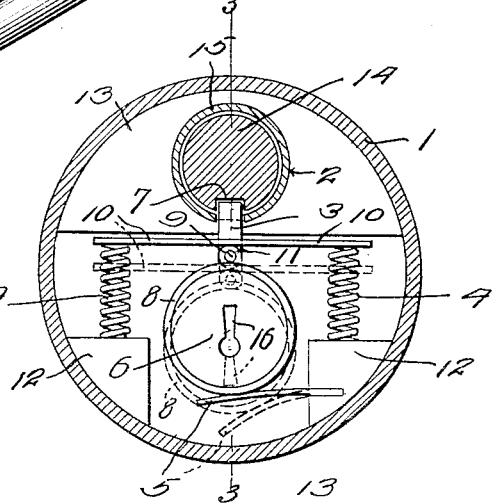
Fig. 2 is a horizontal section through the device.
Figure 3:
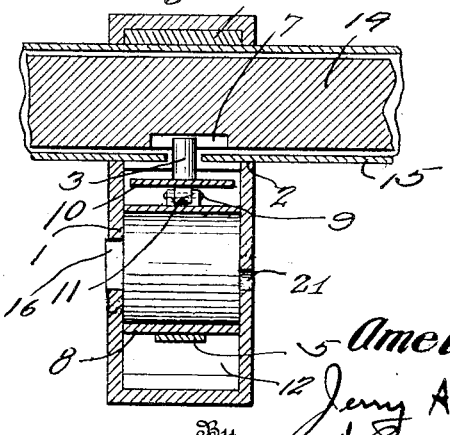
Fig. 3 is a transverse section at right angles to Fig. 2.

Referring to the accompanying drawings, I provide a suitable outer casing 1 having a suitable aperture 2 to receive casing 15 of the automobile steering post 14, or other similar part when the device is applied to other machinery. I provide a suitable bolt 3 adapted to be moved into and out of engagement with the slotted portion 7 of steering shaft 14, as shown in Fig. 2, the tumbler 6 rotating freely in the casing 8 and moving the bolt 3 into and out of locking position. Bolt 3 has its shank engaged by a plate 10, which in turn is resiliently pressed in the direction of the slot in the steering shaft by coil springs 4 which bear against suitable shoulders 12 provided within the lock casing 1 as shown in Fig. 2. I provide a suitable tumbler 6, mounted on journal 21 operated by a key 18 adapted to be inserted through keyhole 16 to move the eccentrically journaled tumbler 6, and the bolt 3, which is connected by pivot 9 to the lugs 11 adjusted to casing 8, in which the eccentrically mounted tumbler 6 is contained as shown in Fig. 3, to the retracted position indicated by dotted lines in Fig. 2. In this position the flat spring 5, which I provide as a reinforcement for coil springs 4 has been moved to the position shown in dotted lines in Fig. 2. Mounted in casing 1 I provide a suitable reinforcing block 13, through which the aperture 2 extends.

It is within the contemplation of my invention to provide a threaded instead of a smooth aperture 2 where it is desired to apply the lock to a threaded shaft, it being within the contemplation of my invention to apply the lock to various uses, especially where it is very desirable to have a lock that absolutely will not rattle under vibration.

What I claim is:

1. In a noiseless lock, the combination of an outer casing, a reinforcing block in said casing, said block having an aperture for removably attaching the device to the article to be locked, a bolt adapted to be moved to a position to project into the aperture when in locked position, a plate to which said bolt is attached, springs bearing against said plate and tending to press the bolt toward locked position, a key operated tumbler operatively connected with the bolt, and resilient means in constant operative connection with said tumbler and tending to press them toward locked position at all times, whereby the lock is prevented from rattling under vibration.

2. In a noiseless lock, the combination of means for mounting the lock on a threaded bolt, a lock casing having a slotted reinforcing block, a reciprocal bolt adapted to project into the slot, a tumbler operatively connected to said bolt, resilient means constantly pressing the tumbler toward locked position, and a spring-pressed plate abutting against the shank of the bolt and tending to press the same toward locked position, the aforesaid springs operating to prevent rattling of the movable parts of the lock under vibration.

AMEL L. PAULSON.